United States Patent
Arndt

(10) Patent No.: US 8,805,462 B2
(45) Date of Patent: Aug. 12, 2014

(54) PROCESS FOR APPLYING POLYMER TO INDIVIDUAL CONDUCTORS AND HTS COMPOSITE PRODUCED FROM THE INDIVIDUAL CONDUCTORS

(75) Inventor: Tabea Arndt, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 69 days.

(21) Appl. No.: 13/499,380

(22) PCT Filed: Sep. 29, 2010

(86) PCT No.: PCT/EP2010/064473
§ 371 (c)(1),
(2), (4) Date: Mar. 30, 2012

(87) PCT Pub. No.: WO2011/039265
PCT Pub. Date: Apr. 7, 2011

(65) Prior Publication Data
US 2012/0190556 A1 Jul. 26, 2012

(30) Foreign Application Priority Data
Sep. 30, 2009 (DE) .......................... 10 2009 047 865

(51) Int. Cl.
*H01L 39/14* (2006.01)
*H01L 39/24* (2006.01)

(52) U.S. Cl.
USPC ............................ 505/231; 505/431; 505/470

(58) Field of Classification Search
CPC .. H01L 39/143; H01L 39/248; H01L 39/2419
USPC .................. 505/230, 231, 430–431, 434, 470
See application file for complete search history.

(56) References Cited

U.S. PATENT DOCUMENTS

2002/0190419 A1* 12/2002 Albrecht et al. ......... 264/171.14

FOREIGN PATENT DOCUMENTS

| DE | 10103324 | 8/2001 |
|---|---|---|
| DE | 102006061940 | 7/2008 |
| EP | 1273015 | 1/2003 |
| JP | 64-33087 | 2/1989 |
| JP | 10-261325 | 9/1998 |
| JP | 11-25772 | 1/1999 |
| JP | 2010-282893 | 12/2010 |
| WO | WO 00/11684 A1 | 3/2000 |
| WO | WO 01/61712 A1 | 8/2001 |
| WO | WO 03/100875 A2 | 12/2003 |

OTHER PUBLICATIONS

Rodney A. Badcock et al., "Progress in the Manufacture of Long Length YBCO Roebel Cables," IEEE Transactions on Applied Superconductivity, vol. 19, No. 3, Jun. 2009, pp. 3244-3247.
German Office Action for German Priority Patent Application No. 10 2009 047 865.5, issued on Jun. 8, 2010.
International Search Report for PCT/EP2010/064473, mailed on Jan. 28, 2011.
Japanese Office Action mailed Jan. 21, 2014 in corresponding Japanese Application No. 2012-531412.

* cited by examiner

*Primary Examiner* — Colleen Dunn
(74) *Attorney, Agent, or Firm* — Staas & Halsey LLP

(57) ABSTRACT

A process applies a polymer to at least one individual conductor of a high-temperature superconductor (HTS) composite in the manner of a Roebel conductor. The at least one individual conductor includes a substrate and a superconducting layer. Particles are applied to the individual conductor. Then, a thermal treatment is performed which results in partial or complete melting of the particles and, after cooling, in a polymer layer on the individual conductor.

20 Claims, 2 Drawing Sheets

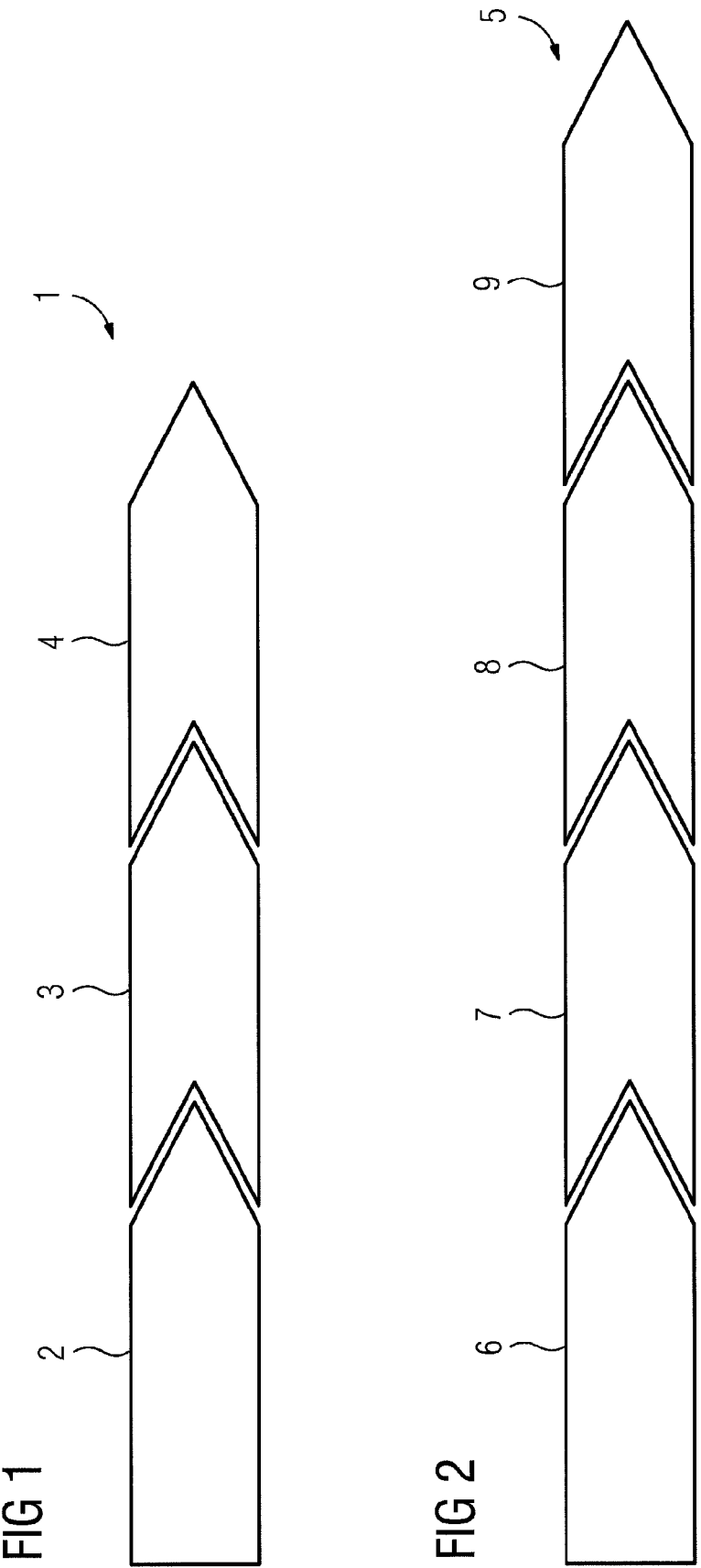

200~# PROCESS FOR APPLYING POLYMER TO INDIVIDUAL CONDUCTORS AND HTS COMPOSITE PRODUCED FROM THE INDIVIDUAL CONDUCTORS

CROSS REFERENCE TO RELATED APPLICATIONS

This application is based on and hereby claims priority to International Application No. PCT/EP2010/064473 filed on Sep. 29, 2010 and German Application No. 10 2009 047 865.5 filed on Sep. 30, 2009, the contents of which are hereby incorporated by reference.

BACKGROUND

The present invention relates to a method for applying a plastic material onto at least one individual conductor of a high-temperature superconductor (HTS) cable in the form of a Roebel conductor, and to a high-temperature superconductor (HTS) cable produced by the method, the at least one individual conductor comprising at least one support and at least one superconducting layer.

Roebel conductors are often used in power engineering, since the "transposition" or "stranding" of the individual electrical conductors with one another leads to lower electrical losses when a current flows through the overall Roebel conductor. In a range of applications, the Roebel conductors are exposed to alternating magnetic fields. Coupling currents are in this case induced in the individual electrical conductors, which contribute to so-called AC losses. The coupling currents can be prevented by insulating the individual electrical conductors from one another.

In conventional Roebel cables, formed of copper or aluminum, conventional insulating varnishes are generally used for the insulation. Adaptation of the insulation method from conventional Roebel cables to high-temperature superconductor (HTS) cables in the form of a Roebel conductor, is possible only limitedly or not at all. On the one hand, high-temperature superconductor (HTS) cables generally comprise individual electrical conductors in tape form, the tapes having high aspect ratios. For example, typical aspect ratios of width to thickness in the case of Bi cuprate HTS tapes are greater than or equal to 10, and in the case of YBCO (yttrium barium copper oxide) tapes, greater than or equal to 20. For this reason, with conventional insulating varnishes, edge thinning or "dog bone" formation occurs, with a very inhomogeneous wall thickness of the insulation over the tape circumference.

On the other hand, the insulating materials must be usable at temperatures lower than 110 K without becoming brittle or frangible. Typical HTS materials only have their transition temperature, i.e. superconducting properties, beyond temperatures lower than 110 K. Only high-grade plastic materials do not become brittle or lose their mechanical integrity at these low temperatures. Only high-grade plastics can therefore be used for the insulation.

It should furthermore be noted that the wall thickness of the insulation reduces the so-called engineering current density, which represents the critical current or operating current divided by the line cross section. Small wall thicknesses of the insulation are therefore advantageous. In conventional varnish insulations, the wall thickness can only be limitedly minimized because of the edge thinning.

In the case of S-shaped transposition regions of individual Roebel conductors, insulation before forming the S-shape is possible only if the insulation has elastic properties. High-temperature superconductors are generally formed from ceramic materials, i.e. they are brittle. Only when the high-temperature superconductor allows plastic bending without breaking, as is the case for example with Bi cuprate HTS tapes, can insulation be carried out before forming the S-region. In the case of YBCO high-temperature superconductors, the S-region has to be formed by punching the individual conductor from a wider tape. Insulation is realistic only after the punching.

One simple insulation method involves single or double winding of the individual Roebel conductors with self-adhesive Kapton tape. The Kapton tape itself generally has a thickness of more than 13 µm. Owing to the adhesive layer and a necessary overlap, the added thickness per side of the individual conductor due to the winding is more than 30 µm. A winding technique with Kapton tape leads to reduced sliding properties of the individual conductors, in particular over one another. This leads to reduced flexibility or bendability of the cable formed from individual conductors. The winding technique is not usable for individual conductors with an S-region shape already formed.

Another insulation method is possible based on polyamide. In this case, the necessary overlap leads to a thickness increase due to the insulation of more than 50 µm per side of the individual conductor.

Alternatively, insulation can be carried out by coextrusion of PEEK (polyether ether ketone) in tube form. This is known, for example, from EP 1 273 015 B1. By this method, uniform insulation of the individual conductors is achieved even over the narrow sides of the HTS tapes. The thickness increase per side is from 20 to 40 µm. This technique has also proven suitable for HTS Roebel cables based on Bi cuprates. However, it is not suitable for insulating HTS Roebel cables based on YBCO material, in which the S-region formation has already taken place before the insulation.

SUMMARY

It is one possible object to provide a method, for applying a plastic material onto at least one individual conductor of a high-temperature superconductor (HTS) cable in the form of a Roebel conductor, to provide a simple method for insulating the individual conductors which makes it possible to form a uniform and very thin insulating layer. In particular, it is a possible object to provide a method which improves, or at least does not or only slightly impairs, the superconducting properties of the individual conductors when applying insulation. It is another possible object to provide a method for insulating the individual conductors, with which the individual conductors when assembled lead to a bendable, flexible cable.

The inventor proposes a high-temperature superconductor (HTS) cable, in the form of a Roebel conductor, is to provide a stable and mechanically flexible superconducting cable which keeps its mechanical integrity, particularly in respect of the insulation of the individual conductors, even at low temperatures.

In the proposed method for applying a plastic material onto at least one individual conductor of a high-temperature superconductor (HTS) cable in the form of a Roebel conductor, the at least one individual conductor comprises at least one support and at least one superconducting layer. Particles are applied onto the at least one individual conductor and a heat treatment is then carried out.

The application of particles and the subsequent heat treatment lead to the formation of an electrically insulating plastic material layer on the at least one individual conductor. At the same time, an improvement of the superconducting properties of the superconducting layer takes place owing to the heat treatment. The adhesion properties of the superconducting layer on the at least one support of the individual conductor are improved by the heat treatment. A smooth, non-brittle insulating layer, which is mechanically stable even at low temperatures, is formed on the at least one support and the at least one superconducting layer.

The particles may be applied by thermal spraying and/or by a dispersion method and/or by a method based on electrostatic interactions.

The heat treatment may be carried out in a temperature range of from 100° C. to 500° C., particularly in a temperature range of from 120° C. to 430° C. At these temperatures, the particles are melted and mechanically bond stably to one another and to the surface of the at least one support and/or the at least one superconducting layer during subsequent cooling. In the temperature range indicated, annealing of the at least one superconducting layer takes place, both the crystalline structure of the superconducting layer being improved, and therefore also the superconducting properties at low temperatures, and the adhesion properties of the superconducting layer on the support being improved.

Particles which have a diameter in the range of less than 10 µm may essentially be applied onto the at least one individual conductor. In this way, a plastic material layer which has a thickness in the range of less than 20 µm can be formed.

The particles may be partially or fully formed from a thermoplastic material, in particular from PEEK (polyether ether ketone) material or PEEEK material or PEEKEK material or PEKK material. These materials do not lead to embrittlement of the insulation at low temperatures, in particular not at operating temperatures of superconducting devices. They are electrically insulating and stable both over time and mechanically. They can form smooth surfaces with good sliding properties. Their melting temperature lies in the range of from 300 to 500° C., and therefore in the indicated temperature range of the heat treatment.

A carrier medium may be removed from the plastic material during the heat treatment. Thus, particularly in the case of dispersion methods for applying the plastic material layer, a carrier medium in which the particles are contained as a dispersion may evaporate or vaporize during the heat treatment. After the vaporization of the carrier medium, a smooth and mechanically stable insulation layer is formed.

During the heat treatment, the particles may be melted and bond to one another and/or bond in a mechanically stable fashion to the at least one individual conductor. This allows good adhesion of the insulating layer on the individual conductor and the formation of a smooth, non-porous, mechanically stable layer.

During the heat treatment, an improvement of the superconducting properties of the high-temperature superconductor (HTS) cable may take place, as well as an improvement of the adhesion of the at least one superconducting layer on the support. The annealing of the superconducting material makes it possible to form a crystalline structure even over large regions, cracks and fractures in the crystalline, in particular monocrystalline structure of the superconducting layer being reduced or eliminated. At high temperatures, mechanically stable bonding of the superconducting material to the material of a support, or to buffer layers on the support base material, takes place. The improved properties of the superconducting layers of the individual conductors lead to improved properties of the high-temperature superconductor (HTS) cable.

The plastic material may form an essentially smooth and/or electrically insulating and/or bendable and/or essentially slideable surface on the at least one individual conductor. With the aid of these properties of the individual conductor surfaces, a flexible and mechanically stable high-temperature superconductor (HTS) cable with good superconducting and mechanical properties, stable over time, at low temperatures, is formed from the individual conductors.

The application of the plastic material onto the at least one individual conductor may take place before shaping the individual conductor, in particular before shaping the individual conductor in an S-shape and/or in particular before shaping by punching.

As an alternative, the application of the plastic material onto the at least one individual conductor may take place after shaping the individual conductor, in particular after shaping the individual conductor in an S-shape and/or in particular after shaping by punching.

A high-temperature superconductor (HTS) cable is proposed by the inventor, has the form of a Roebel conductor, is produced by the method described above, and is composed of a plurality of individual conductors. The individual conductors respectively comprise at least one support and at least one superconducting layer as well as a plastic material layer formed on the at least one support and/or on the at least one superconducting layer. The individual conductors are interlaced with one another so that a Roebel conductor is formed and successive neighboring individual conductors are respectively electrically contacted via contact regions at their ends, and remaining regions of the surface of the individual conductors are respectively coated with the plastic material layer and electrically insulated from neighboring individual conductors.

The plastic material layer of an individual conductor may have a maximum thickness in the range of less than 10 µm. In this way, a high "engineering current strength", i.e. a high critical current, is possible. Edge thinning, such as occurs with conventional varnish insulation, is not formed or is formed to a reduced extent. The plastic material layer is usable even at temperatures below the transition temperature of the superconducting layer, i.e. it does not become brittle at these temperatures and it allows the individual conductors to slide over one another, so that the high-temperature superconductor (HTS) cable is bendable and flexible.

The above-mentioned advantages associated with the method, for applying a plastic material onto at least one individual conductor of a high-temperature superconductor (HTS) cable in the form of a Roebel conductor, are obtained for the high-temperature superconductor (HTS) cable in the form of a Roebel conductor, produced by the method described above.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows a flowchart of a process for the plastic material coating of an individual conductor of a high-temperature superconductor (HTS) cable with particles, and FIG. 2 shows a flowchart of a dispersion process for the plastic material coating of the individual conductor with particles.

DETAILED DESCRIPTION OF THE PREFERRED EMBODIMENT

Figure 3:
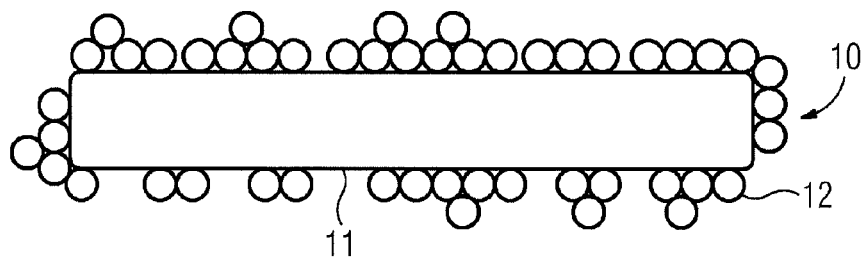
FIG. 3 shows an individual conductor, coated with particles according to the method of FIG. 1, before a process step of melt annealing.

Reference will now be made in detail to the preferred embodiments of the present invention, examples of which are illustrated in the accompanying drawings, wherein like reference numerals refer to like elements throughout.

Figure 4:
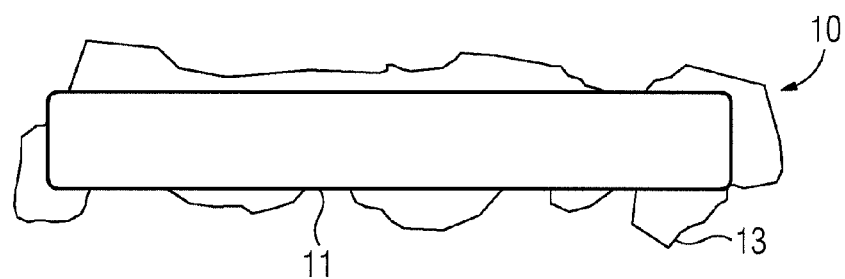
FIG. 4 shows an individual conductor, coated with particles according to the method of FIG. 1, after a process step of melt annealing.

FIG. 1 represents a process schematic 1 of the particle coating of an individual conductor 10 with "dry" particles of plastic material 12. FIGS. 3 and 4 correspondingly represent the individual conductor 10 after individual process steps. The individual conductor 10 comprises a support 11 having at least one superconducting layer. The support is formed, for example, of steel. The layer may, for example, be formed from YBCO material and be configured as a thin coating of a surface of one or more sides of the support 11. For better adhesion of the superconducting layer, one or more buffer layers may be arranged between the surface of the support 11 and the superconducting layer located thereon.

In the method represented in FIG. 1, the particles 12 for coating the individual conductor 10 with plastic material are applied onto the individual conductors 10 in a first step by electrostatic coating or by powder coating. The coated individual conductors 10 are subsequently exposed in a tube oven to a heat treatment 3, the so-called melt anneal, at a temperature of for example 430° C. The particles 12 thereby melt on their surface, or fully, and bond to neighboring particles 12 and/or to the surface of the individual conductor 10. In a subsequent step of the method 1, the coated individual conductors 10 are cooled to room temperature, for example with the aid of a compressed air section 4.

As a result of the method 1, an individual conductor 10 coated with plastic material is obtained, as represented for example in FIG. 4. The plastic material layer 13 may fully enclose the support 11 and/or the superconducting layer or, as represented in FIG. 4, it may cover only particular regions of the support 11 or the superconducting layer.

Figure 5:
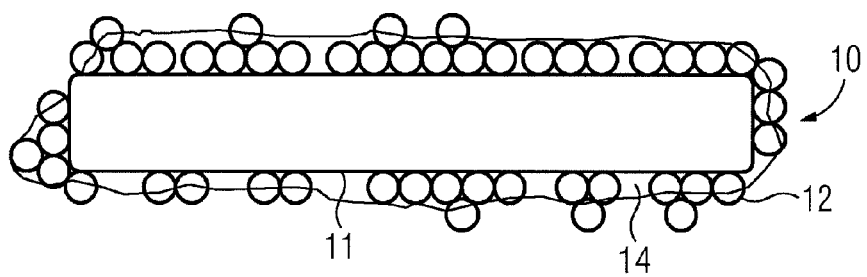
FIG. 5 shows an individual conductor, coated with particles according to the method of FIG. 2, before a process step of dry annealing.
Figure 6:
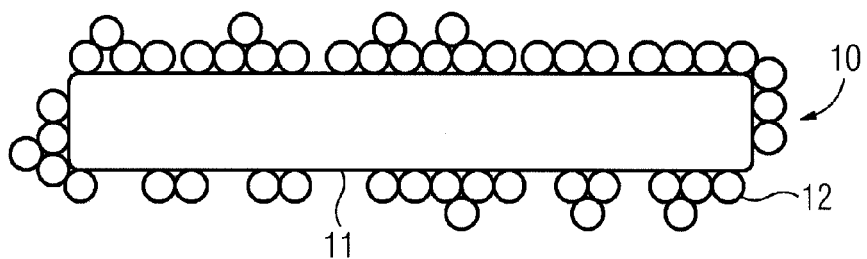
FIG. 6 shows an individual conductor, coated with particles according to the method of FIG. 2, after a process step of dry annealing.
Figure 7:
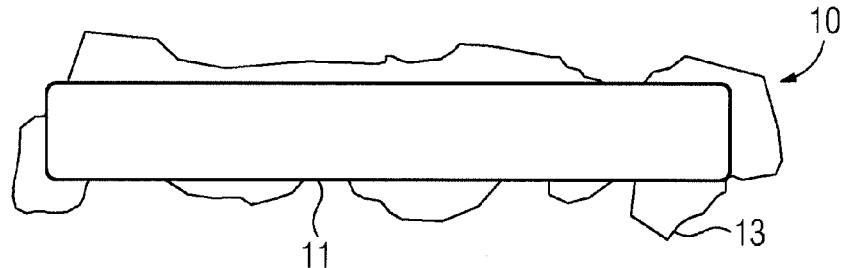
FIG. 7 shows an individual conductor, coated with particles according to the method of FIG. 2, after a process step of melt annealing.

An alternative method 5 for coating the individual conductor 10 is represented in FIG. 2. In FIGS. 5, 6 and 7, the individual conductor 10 is represented after various process steps of the method 5. In a similar way to the method of FIG. 1, the starting point used for the method represented in FIG. 2 is a support 11 having a superconducting layer and optionally having one or more buffer layers arranged between the support 11 and the superconducting layer.

A dispersion comprising particles 11 of plastic material and a carrier medium 14 is applied 6 onto the support 11 and/or the superconducting layer, which is not represented in FIGS. 3 to 7 for the sake of clarity. The application of the dispersion 6 may be carried out by spray nozzles or direct nozzle application. In a subsequent process step, the coated individual conductors 10 are subjected to a dry anneal 7, for example in a tube oven at about 120° C. As represented in FIG. 6, as a result of this the carrier medium 14 of the particles 12 is vaporized and the particles 12 are then essentially in a "dry" state on the support 11 comprising the superconducting layer. In a subsequent process step, in a similar way to the process shown in FIG. 1, a melt anneal 8 may be carried out at a temperature in the range of between 120° C. and 430° C. The particles 12 are thereby partially or fully melted and bond to one another and/or to the surface of the individual conductor 10, i.e. to the surface of the support 11 and/or to the surface of the superconducting layer. The individual conductors 10 may subsequently be cooled to room temperature in a compressed air section 9. A closed or open layer 13 of plastic material is thereby formed on the support 11 comprising a superconducting layer, as represented in FIG. 7.

A plurality of individual conductors 10 may be used after coating with particles 12 by the method of FIG. 1 or 2 in order to produce a high-temperature superconductor (HTS) cable in the form of a Roebel conductor. In this case, either the individual conductors 10 are brought into an S-shape before the coating, or after the coating they are punched from a coated strip into an S-shape, or cut out by laser processing. The coated individual conductors 10 are interlaced with one another in order to obtain a transposed conductor structure, the so-called Roebel conductor. At the ends, the individual conductors 10 are only partially coated or are uncoated, in order to permit electrical contact of successively arranged individual conductors with one another. Neighboring individual conductors 10 not arranged in succession are electrically insulated from one another by the plastic material layer 13.

PEEK may be used as a material for the plastic material layer 13. Other materials are nevertheless possible, depending on the temperatures used in the processes.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

The invention claimed is:

1. A method for applying a plastic material, comprising:
   providing individual conductors, each having a superconducting layer formed on a support;
   applying a multitude of particles formed of the plastic material to the individual conductors;
   heat treating the particles applied to the individual conductors; and
   combining the individual conductors to form a high-temperature superconductor (HTS) cable in the form of a Roebel conductor.

2. The method as claimed in claim 1, wherein the particles are applied by thermal spraying, a dispersion method, or using electrostatic interactions.

3. The method as claimed in claim 1, wherein the particles are heat treated at a temperature of from 100° C. to 500° C.

4. The method as claimed in claim 1, wherein the particles are heat treated at a temperature of from 120° C. to 430° C.

5. The method as claimed in claim 1, wherein
   the particles which have a diameter of less than 10 μm, and/or
   heat treating the particles forms a plastic material layer having a thickness of less than 20 μm on the individual conductors.

6. The method as claimed in claim 1, wherein
the particles which have a diameter of less than 10 μm, and
heat treating the particles forms a plastic material layer having a thickness of less than 20 μm on the individual conductors.

7. The method as claimed in claim 1, wherein the particles are formed from at least one thermoplastic material selected from the group consisting of polyether ether ketone (PEEK), polyether ether ether ketone (PEEEK), polyether ether ether ketone ether ketone (PEEKEK), and polyether ketone ketone (PEKK).

8. The method as claimed in claim 1, wherein a carrier medium is removed from the plastic material during heat treatment.

9. The method as claimed in claim 1, wherein heat treating the particles causes the particles to melt and bond to one another and/or bond in a mechanically stable fashion to the individual conductors.

10. The method as claimed in claim 1, wherein heat treating the particles causes the particles to melt and bond to one another and bond in a mechanically stable fashion to the individual conductors.

11. The method as claimed in claim 1, wherein
heat treating the particles reduces crystalline imperfections in the superconducting layer to improve superconducting properties of the high-temperature superconductor (HTS) cable and/or
heat treating the particles improves adhesion of the superconducting layer to the support.

12. The method as claimed in claim 1, wherein
heat treating the particles reduces crystalline imperfections in the superconducting layer to improve superconducting properties of the high-temperature superconductor (HTS) cable, and
heat treating the particles improves adhesion of the superconducting layer to the support.

13. The method as claimed in claim 1, wherein the plastic material forms an essentially smooth and/or electrically insulating and/or bendable and/or essentially slideable surface on the individual conductors.

14. The method as claimed in claim 1, wherein the plastic material forms an essentially smooth, electrically insulating, bendable and essentially slideable surface on the individual conductors.

15. The method as claimed in claim 1, wherein
shaping is performed on the individual conductors, and
heat treating takes place before shaping the individual conductors.

16. The method as claimed in claim 1, wherein
shaping is performed on the individual conductors, and
heat treating takes place after shaping the individual conductors.

17. A high-temperature superconductor, comprising:
individual conductors, each having a superconducting layer formed on a support;
a plastic material layer formed on the support and/or on the superconducting layer of the individual conductors by a process comprising:
applying a multitude of particles formed of the plastic material to each of the individual conductors; and
heat treating the particles applied to the individual conductors, wherein
the individual conductors are interlaced with one another so that a Roebel conductor cable is formed with neighboring individual conductors being electrically contacted at their ends with remaining regions of the neighboring individual conductors being electrically insulated from one another with the plastic material layer, and
the plastic material layer has an open structure with openings through the plastic material layer.

18. The high-temperature superconductor (HTS) cable as claimed in claim 17, wherein the plastic material layer has a maximum thickness less than 10 μm on the individual conductors.

19. The method as claimed in claim 15, wherein shaping the individual conductors comprises shaping the individual conductors in an S-shape or shaping the individual conductors by punching.

20. The method as claimed in claim 16, wherein shaping the individual conductors comprises shaping the individual conductors in an S-shape or shaping the individual conductors by punching.

* * * * *

UNITED STATES PATENT AND TRADEMARK OFFICE
CERTIFICATE OF CORRECTION

| | | |
|---|---|---|
| PATENT NO. | : 8,805,462 B2 | Page 1 of 1 |
| APPLICATION NO. | : 13/499380 | |
| DATED | : August 12, 2014 | |
| INVENTOR(S) | : Tabea Arndt | |

It is certified that error appears in the above-identified patent and that said Letters Patent is hereby corrected as shown below:

In the Claims

Column 6, Line 49, In Claim 1, Delete "material to the" and insert -- material to each of the --, therefor.

Signed and Sealed this
Fourth Day of November, 2014

Michelle K. Lee
*Deputy Director of the United States Patent and Trademark Office*